US008437305B2

(12) United States Patent
Cheever et al.

(10) Patent No.: US 8,437,305 B2
(45) Date of Patent: May 7, 2013

(54) METHOD FOR PROVIDING HOME AGENT GEOGRAPHIC REDUNDANCY

(75) Inventors: Greg Cheever, Hampstead, NH (US); Sanil Kumar Puthiyandyil, Nashua, NH (US); Rajesh Ramankutty, Nashua, NH (US); Satya (Satish) Vasamsetti, Danville, CA (US); Clarence Drumheller, Easton, PA (US)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 11/286,049

(22) Filed: Nov. 23, 2005

(65) Prior Publication Data

US 2007/0116019 A1    May 24, 2007

(51) Int. Cl.
*H04W 4/00*      (2009.01)

(52) U.S. Cl.
USPC ........... 370/331; 370/217; 370/329; 455/433; 455/435.1; 455/502

(58) Field of Classification Search ................... 370/217, 370/329, 331; 455/433, 435.1, 502
See application file for complete search history.

(56) References Cited

U.S. PATENT DOCUMENTS

| | | | |
|---|---|---|---|
| 6,195,705 B1 | 2/2001 | Leung | |
| 6,487,605 B1 | 11/2002 | Leung | |
| 6,621,810 B1 | 9/2003 | Leung | |
| 6,771,623 B2 | 8/2004 | Ton et al. | |
| 6,795,705 B1 * | 9/2004 | Warrier et al. | 455/435.1 |
| 6,799,204 B1 * | 9/2004 | Baba et al. | 709/220 |
| 7,080,151 B1 * | 7/2006 | Borella et al. | 709/230 |
| 7,173,917 B1 | 2/2007 | Narayanan et al. | |
| 7,227,863 B1 * | 6/2007 | Leung et al. | 370/390 |
| 7,457,882 B2 | 11/2008 | Stewart et al. | |
| 7,480,737 B2 * | 1/2009 | Chauffour et al. | 709/245 |
| 2001/0021175 A1 | 9/2001 | Haverinen | |
| 2002/0010865 A1 * | 1/2002 | Fulton et al. | 713/201 |
| 2002/0067704 A1 * | 6/2002 | Ton | 370/329 |

(Continued)

FOREIGN PATENT DOCUMENTS

| | | |
|---|---|---|
| EP | 1 783 979 | 5/2007 |
| WO | 00/45560 | 8/2000 |
| WO | WO 03085540 A2 * | 10/2003 |

OTHER PUBLICATIONS

International Search Report and Written Opinion issued for International Patent Application No. PCT/US2006/045256.

(Continued)

*Primary Examiner* — Rafael Pérez-Gutiérrez
*Assistant Examiner* — Liton Miah
(74) *Attorney, Agent, or Firm* — Wilmer Cutler Pickering Hale and Dorr LLP (57) ABSTRACT

Methods and systems for providing redundancy in servicing packet data communications within wireless mobile data networks are disclosed. More particularly, the method and system for provide a redundant Home Agent with the ability to assume the role of the primary Home Agent in the event of a primary Home Agent network, software, or other failure. The redundancy allows Home Agent services to remain functional in the case of a failure of one of the Home Agents in the redundant group, which may be composed of one or more Home Agents. The Home Agents can be located in geographically separate areas to ensure that a network outage event in one geographic area does not cause subscriber services to be impacted.

25 Claims, 11 Drawing Sheets

U.S. PATENT DOCUMENTS

| | | | |
|---|---|---|---|
| 2002/0080752 A1 | 6/2002 | Johansson et al. | |
| 2002/0165944 A1* | 11/2002 | Wisner et al. | 709/220 |
| 2002/0184387 A1* | 12/2002 | Yamaya et al. | 709/238 |
| 2003/0056138 A1* | 3/2003 | Ren | 714/4 |
| 2003/0073439 A1 | 4/2003 | Wenzel et al. | |
| 2003/0182433 A1* | 9/2003 | Kulkarni et al. | 709/228 |
| 2004/0066749 A1* | 4/2004 | Watanabe | 370/242 |
| 2004/0083403 A1* | 4/2004 | Khosravi | 714/13 |
| 2004/0090941 A1 | 5/2004 | Faccin et al. | |
| 2004/0095881 A1 | 5/2004 | Borella et al. | |
| 2004/0202126 A1* | 10/2004 | Leung et al. | 370/331 |
| 2005/0207382 A1 | 9/2005 | Hirashima et al. | |
| 2005/0207429 A1 | 9/2005 | Akita et al. | |
| 2005/0281194 A1* | 12/2005 | Sonoda | 370/220 |
| 2006/0174039 A1 | 8/2006 | Stewart et al. | |
| 2007/0066273 A1* | 3/2007 | Laroia et al. | 455/343.2 |
| 2007/0066329 A1* | 3/2007 | Laroia et al. | 455/502 |
| 2007/0165516 A1 | 7/2007 | Xu et al. | |
| 2007/0245167 A1 | 10/2007 | De La Cruz et al. | |

OTHER PUBLICATIONS

File History for U.S. Appl. No. 11/286,050.
File History for U.S. Appl. No. 11/731,920.

* cited by examiner

METHOD FOR PROVIDING HOME AGENT GEOGRAPHIC REDUNDANCY

BACKGROUND OF THE INVENTION

The present invention relates to servicing calls in wireless mobile data networks. More particularly, this invention relates to providing redundancy in the servicing of packet data communications by Home Agents within wireless mobile data networks.

Wireless networks provide users with data without the need for a wired line tethering the user to a certain location. A wireless network is typically composed of a mobile device, base stations, and a supporting infrastructure. The mobile device can be, for example, a cell phone, a PDA, or a computer with wireless capabilities. These mobile devices interact with base stations that transmit and receive data. The base stations can further be connected to a network infrastructure that connects to the public switched telephone network (PSTN), the Internet, and/or other communication networks.

While cellular wireless communication systems were originally designed to transmit voice communications, increasingly these networks have been modified to also support data communications, such as packet based data communications. Mobile IP, a form of packet based data communication, enables mobile devices to change where they are connecting to the Internet without changing their Internet protocol (IP) address. Various agents assist in the transmission of packets from a mobile device to the Internet. A Home Agent performs the mobility management functions needed for IP communications on behalf of the mobile device. Mobile devices get the Home Agent address either through a static configuration, where the IP address of the Home Agent is hard-coded in the mobile device, or through a mobile IP registration process.

When a registration process is used, a server is responsible for assigning Home Agents to mobile devices. In either the static assignment or the server registration of a mobile device with a Home Agent, it is important that the assigned Home Agent is fully functional. Therefore, it is highly desirable to provide redundancy so that a fully functionally Home Agent is always available for a mobile device.

SUMMARY OF THE INVENTION

In accordance with the present invention, techniques and systems for providing redundancy in the servicing of packet data communications within wireless mobile data networks are provided. More particularly, techniques and systems where a first Home Agent can initiate a switchover to a second Home Agent to service existing and future packet data communications on a network are provided.

Thus, in accordance with the present invention, certain embodiments feature a method for providing Home Agent redundancy including initializing a first Home Agent to an Active state, initializing a second Home Agent to a Standby state, and initiating a switchover from the first Home Agent to the second Home Agent, wherein the second Home Agent uses the first Home Agent's identification information.

Further in accordance with the present invention, certain embodiments feature a system for providing Home Agent redundancy including a first Home Agent in an Active state, a second Home Agent in a Standby state coupled to the first Home Agent, and a communication link coupling the first Home Agent to the second Home Agent, wherein the second Home Agent switches to an Active state using the first Home Agent's identification information.

Still further in accordance with the present invention, certain embodiments feature a system for providing Home Agent redundancy including a mechanism for initializing a first Home Agent to an Active state, a mechanism for initializing a second Home Agent to a Standby state, and a mechanism for initiating a switchover from the first Home Agent to the second Home Agent, wherein the second Home Agent uses the first Home Agent's identification information.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

In accordance with the present invention, systems and techniques for providing redundancy in the servicing of packet data communications within wireless mobile data networks are disclosed. More particularly, this invention proposes a technique for providing a redundant Home Agent with the ability to assume the role of the primary Home Agent in the event of a primary Home Agent network or software failure. The redundancy allows the Home Agent services to remain functional even in the event of a failure of one of the Home Agents in the redundant group, which may be composed of two or more Home Agents. The Home Agents can be located in geographically separate areas to ensure that a network outage event in one geographic area does not cause subscriber services to be impacted in another area.

Figure 1:
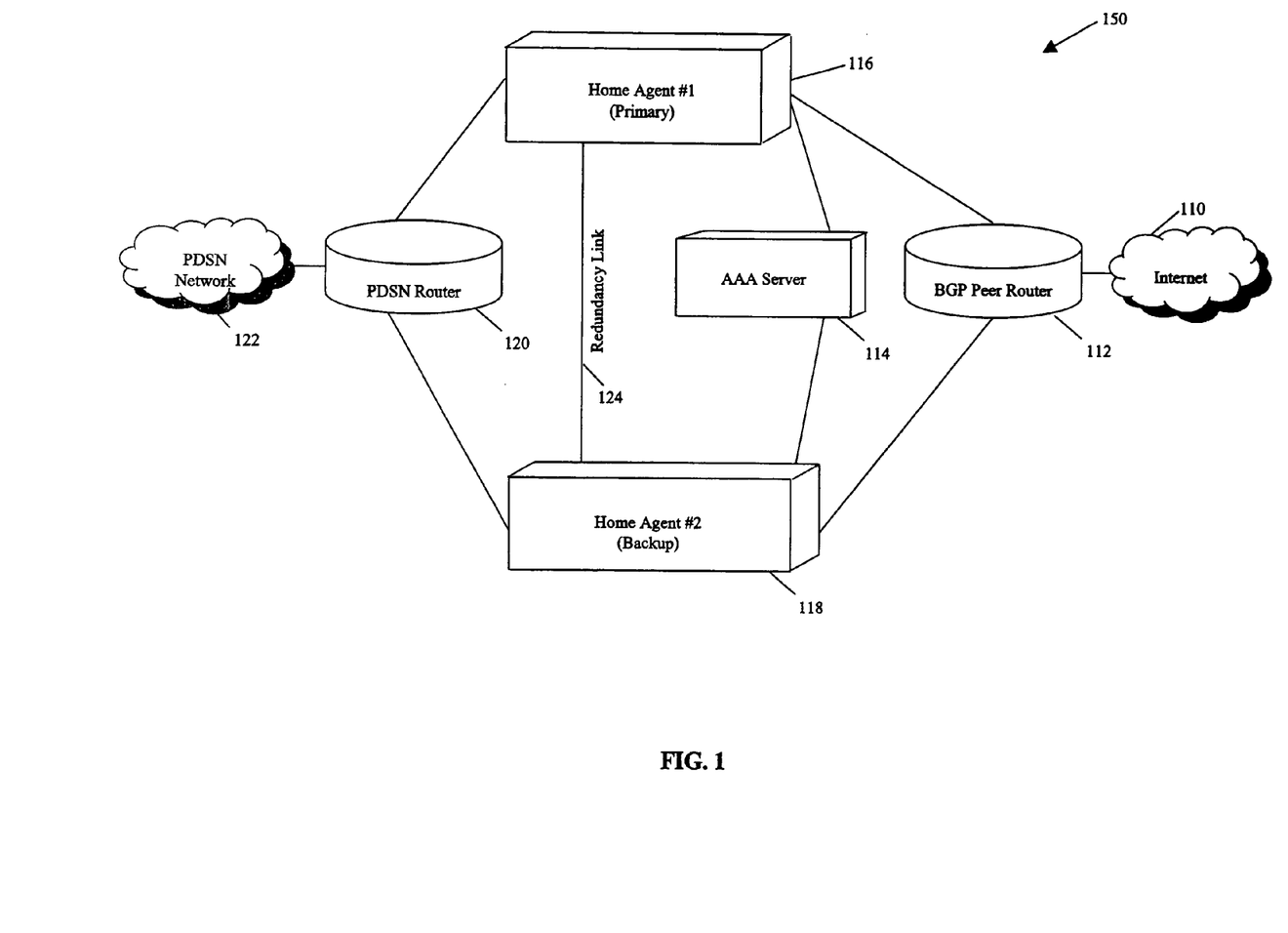
FIG. 1 is a schematic diagram of a network that is capable of transmitting data in accordance with certain embodiments of the present invention.

FIG. 1 illustrates a system 150 that composes a network diagram in accordance with certain embodiments of the present invention. Illustrated system 150 contains Internet 110, a Border Gateway Protocol (BGP) Router 112, an Authentication, Authorization, and Accounting (AAA) Server 114, Home Agent (HA#1) 116, Home Agent (HA#2) 118, Packet Data Switched Network (PDSN) Router 120, a PDSN Network 122, and a Redundancy Link 124. Generally speaking, BGP is a system routing protocol that is commonly used to exchange routing information for the Internet between Internet service providers. BGP Router 112 may be used to propagate Internet Protocol (IP) information throughout the routing domain and Internet 110.

As illustrated, AAA Server 114 can interact with HA#1 116 and HA#2 118 to handle mobile device requests for access to network resources. In some embodiments, AAA Server 114 communicates with a Remote Authentication Dial-In User Service (RADIUS) Server to authenticate and authorize access to system resources. Illustrated HA#1 116 is the primary Home Agent and actively handles IP communications, while HA#2 118 is a backup Home Agent. As shown, HA#1 116 and HA#2 118 are connected by Redundancy Link 124 that provides a channel for passing information and allows the two Home Agents to switch states. The two Home Agents, HA#1 116 and HA#2 118, are connected to PDSN Router 120. PDSN Router 120 may forward data packets through PDSN Network 122 and eventually to the mobile device requesting the data.

In certain embodiments of the present invention, a group of Home Agents may be configured in a primary/backup configuration. In FIG. 1, the primary Home Agent, HA#1 116, can provide Home Agent services during normal operating conditions. Likewise, the backup Home Agent, HA#2 118, can provide Home Agent services during failure conditions. When a Home Agent is providing services, it is considered to be in an "Active state," and when the Home Agent is not providing services, it is considered to be in a "Standby state." An inter-Home-Agent communication channel, for example Redundancy Link 124, may be used to allow the Home Agents to communicate to determine the state of the Home Agents. The Home Agents may also communicate through the existing network infrastructure. In some embodiments of the invention, the "Standby" Home Agent may not switch to "Active" unless a failure is detected. In other embodiments, the Home Agents may switched manually for performing, for example, maintenance or upgrades to one of the Home Agents.

Figure 2:
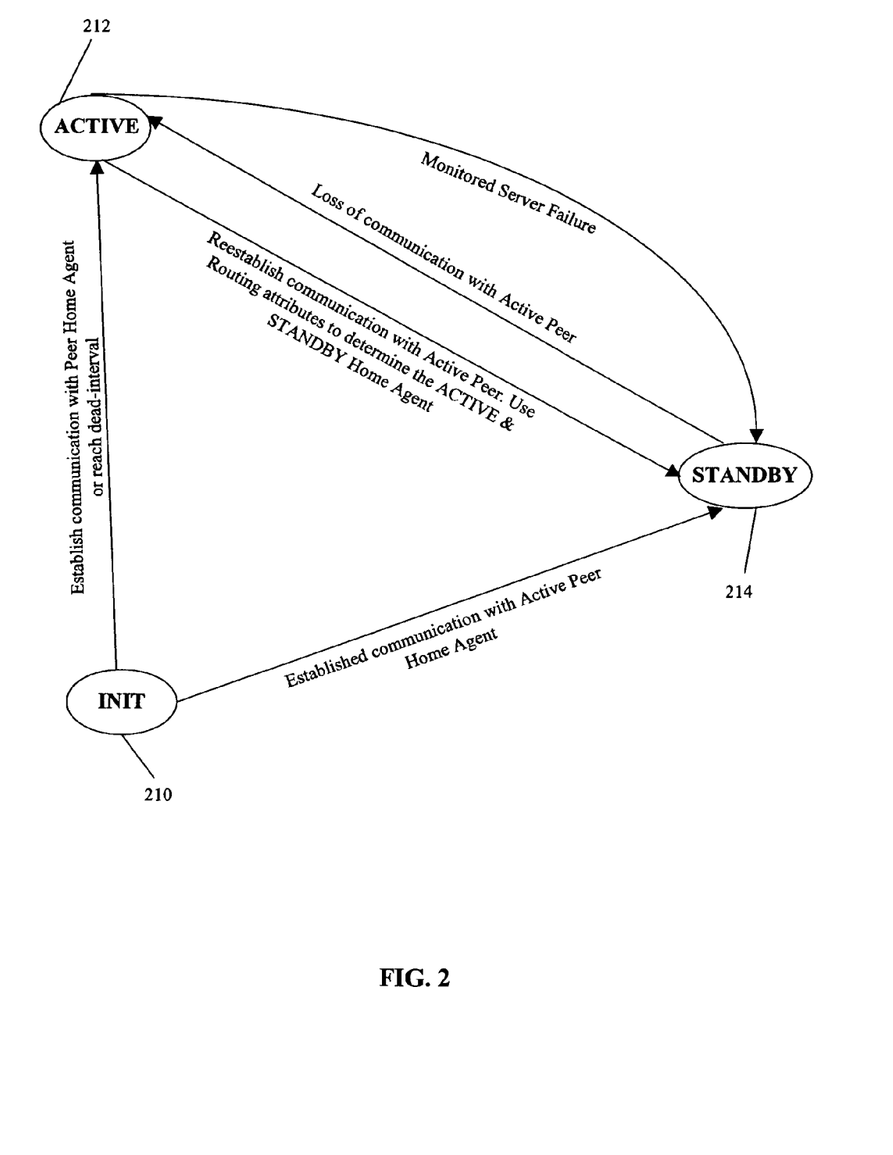
FIG. 2 is a schematic diagram illustrating various state transitions in accordance with certain embodiments of the present invention.

FIG. 2 illustrates three states a Home Agent may reside in during operation in accordance with certain embodiments of the present invention. The states illustrated are Initialization state "Init" 210, Active state "Active" 212, and Standby state "Standby" 214. The Home Agent typically begins in Init 210 and may attempt to establish communication with one or more configured peer Home Agents. As shown in FIG. 2, from init a Home Agent may transition to Active 212 or to Standby 214. If communication is established with a peer home agent three possibilities may occur: 1) if the peer is Active 212, the Home Agent may transition to Standby 214; 2) if the peer is Standby 214, the Home Agent may transition to Active 212; 3) if the peer is Init 210, the Home Agent may become Active 212 or go into Standby 214 depending on a characteristic identifier of the peer Home Agent. If the Home Agent is Init 210, and no communication with a peer is established within a specified time interval, which may be called a dead-interval, the Home Agent may transition to Active 212. In certain embodiments, any transition to Active 212 may only be performed if all monitored services are considered up and running.

If the Home Agent is Active 212, then it can transition to Standby 214 depending on the circumstances. For example, if the Home Agent receives a message from a peer Home Agent that is also Active 212, two possibilities may occur. One possibility is the Home Agent compares a routing attribute received from the peer Home Agent with its own routing attribute and transitions to Standby 214 depending on a decision criteria or rule set. In certain embodiments, the routing attribute comes from BGP Router 112 and may be a BGP modifier. In other embodiments an attribute contention mechanism exists. The attribute contention mechanism is utilized when the attributes being compared are equal to one another. The attribute contention mechanism may defer to another attribute to determine which Home Agent should change to Standby 214. Another possibility, in some embodiments, is the Home Agent is Active 212, but a monitored server failure (e.g., an internal software error) occurs and the Home Agent transitions to Standby 214 notifying the peer Home Agent of its transition intentions.

If the Home Agent is in Standby 214, it may transition to Active 212 depending on the circumstances. The Home Agent may transition to Active 212 if it receives a message from a peer Home Agent that is transitioning to Standby 214 due to a monitoring failure. Another possibility is the Home Agent does not receive a message from an Active peer Home Agent within a dead-interval, and the Home Agent transitions to Active 212.

In some embodiments, the primary and backup Home Agents, illustrated HA#1 116 and HA#2 118 respectively, may be configured with common identification information which can include loopback interface and IP Pool information. The Home Agent services run on these loopback interface routes and they may be advertised throughout the IP routing domain, in certain embodiments, through the use of a dynamic routing protocol on the Active Home Agent. In the event of a failure, for example, the Standby Home Agent transitions to Active and begins advertising the common loopback and IP Pool routes (i.e., advertising the same loopback and IP Pool routes as the previously Active Home Agent). This may allow other elements in the network to transition to the Standby Home Agent without service interruption.

In order to preserve existing subscriber sessions during a switchover event, in certain embodiments, the Home Agents send messages to each other during operation. The messages may allow the Standby Home Agent to resume a session of the Active Home Agent in the event that the Standby Home Agent transitions to Active 212. In some embodiments, the Active Home Agent may monitor the following items to detect a possible failure: 1) dynamic routing peer connectivity; 2) AAA server connectivity; 3) Standby Home Agent connectivity; 4) internal software state. The Home Agent may initiate a switchover event to allow the Standby Home Agent to transition to Active 212 to avoid service interruption to any existing or new subscribers in the event one of these items fails.

Figure 3:
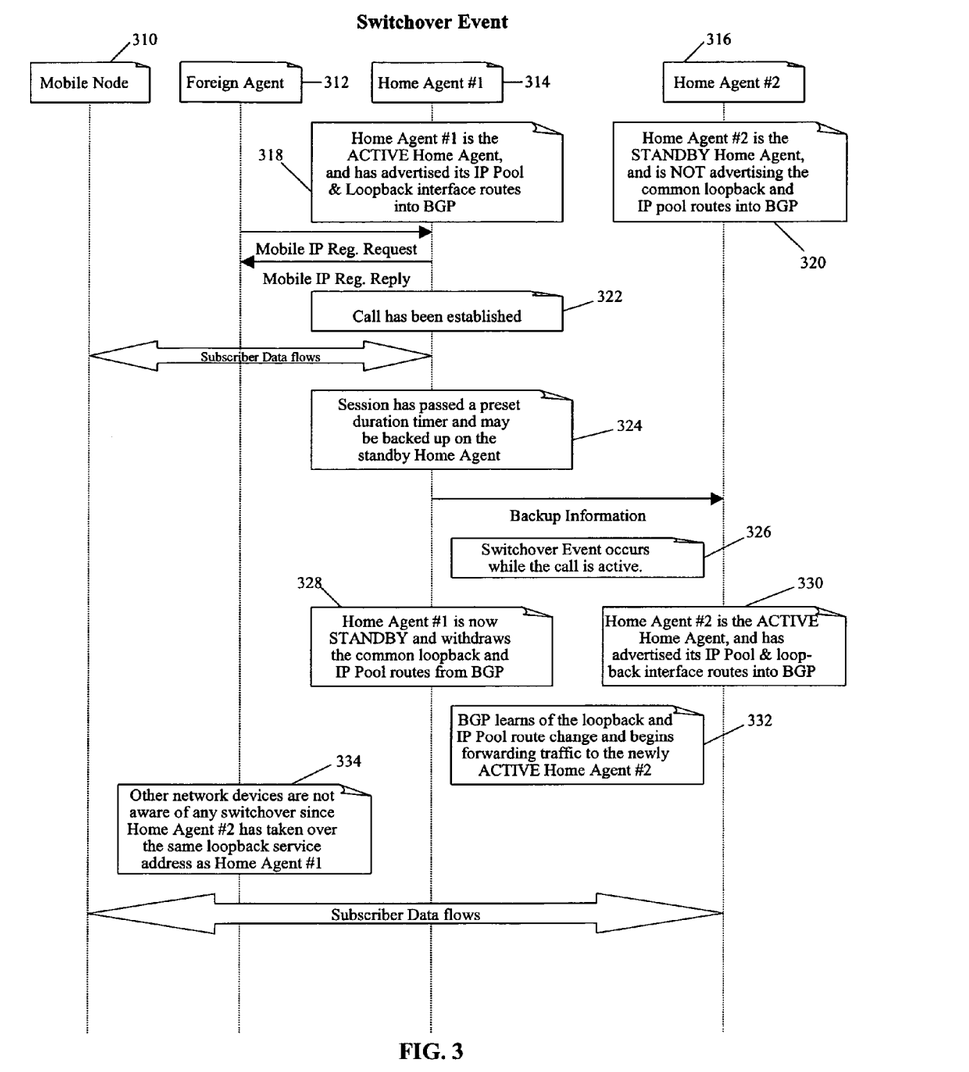
FIG. 3 is a schematic diagram illustrating switchover message flow in accordance with certain embodiments of the present invention.

FIG. 3 illustrates the interactions between Mobile Node 310, Foreign Agent 312, Home Agent #1 314, and Home Agent #2 316 in a switchover event in accordance with certain embodiments of the present invention. As shown in this example, Active Home Agent #1 314 advertises its IP Pool and loopback interface routes into the BGP router in step 318. Standby Home Agent #2 316 does not advertise the common loopback and IP pool routes to the BGP router in step 320. At some later point in time, Home Agent #1 314 receives a Mobile IP registration request from Foreign Agent 312. When Home Agent #1 314 replies to the request, a call is established in step 322. Subscriber data can then flow for some time from Mobile Node 310 to Home Agent #1 314.

According to some embodiments of the invention, data from Home Agent #1 314 is backed up on Home Agent #2 316 at certain points in time in step 324. The backup of information may occur because a preset duration timer has expired or because a predefined event triggers the backup. The backup information includes the data necessary to either continue a call or to recreate a call on another Home Agent. The backup information may also provide any other ancillary data desired. If a switchover event occurs while a call is Active in step 326, Home Agent #1 314 may revert to Standby, withdrawing the common loopback and IP Pool routes from a Border Gateway Protocol (BGP) Router in step 328. This allows Home Agent #2 316 to advertise its IP Pool and loopback routes to the BGP router in step 330. When the BGP router learns of the change, it begins forwarding traffic to Home Agent #2 316 in step 332 and the subscriber data begins flowing through Home Agent #2 316. Because Home Agent #1 314 and Home Agent #2 316 use the same loopback service address, other network devices may not be aware of any switchover in step 334.

Figure 4:
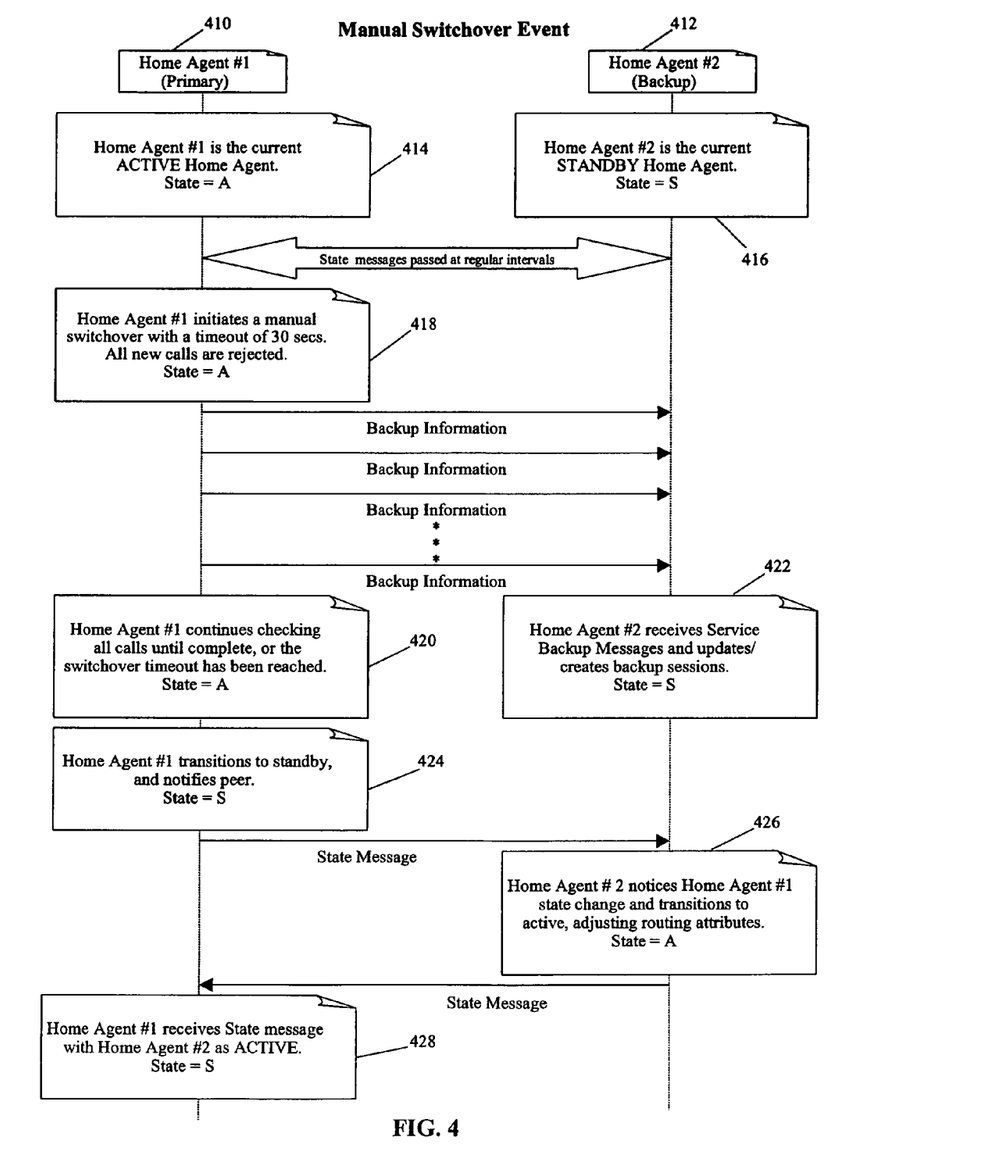
FIG. 4 is a schematic diagram illustrating a manual switchover in accordance with certain embodiments of the present invention.

FIG. 4 illustrates a manual switchover event involving Home Agent #1 410 and Home Agent #2 412 in accordance with certain embodiments of the invention. As shown in this example, Home Agent #1 410 is in an Active state in step 414 and Home Agent #2 412 is in a Standby state in step 416. State messages are sent at regular intervals between the two Home Agents. In some embodiments, the state messages contain information on whether the sending Home Agent is Active, Standby, or Init. The state message can also contain routing attribute information for deciding Init transitions.

When Home Agent #1 410 initiates a manual switchover event 418, in some embodiments, no more new calls are taken and backup information is passed to Home Agent #2 412. Home Agent #1 continues checking the calls it is handling until the calls are complete or a switchover timeout has been reached in step 420. At about the same time, Home Agent #2 412 may update its information on the active calls and its configuration settings from the backup information it is receiving from Home Agent #1 410 in step 422. When Home Agent #1 410 is no longer servicing any calls, it can transition to Standby and notify Home Agent #2 412 through a state message in step 424. This state message alerts Home Agent #2 412 of Home Agent #1's state change so Home Agent #2 412 can transition to Active in step 426. In certain embodiments, Home Agent #2 412 then sends a state message to Home Agent #1 410 to indicate it is in the Active state in step 428.

Figure 5:
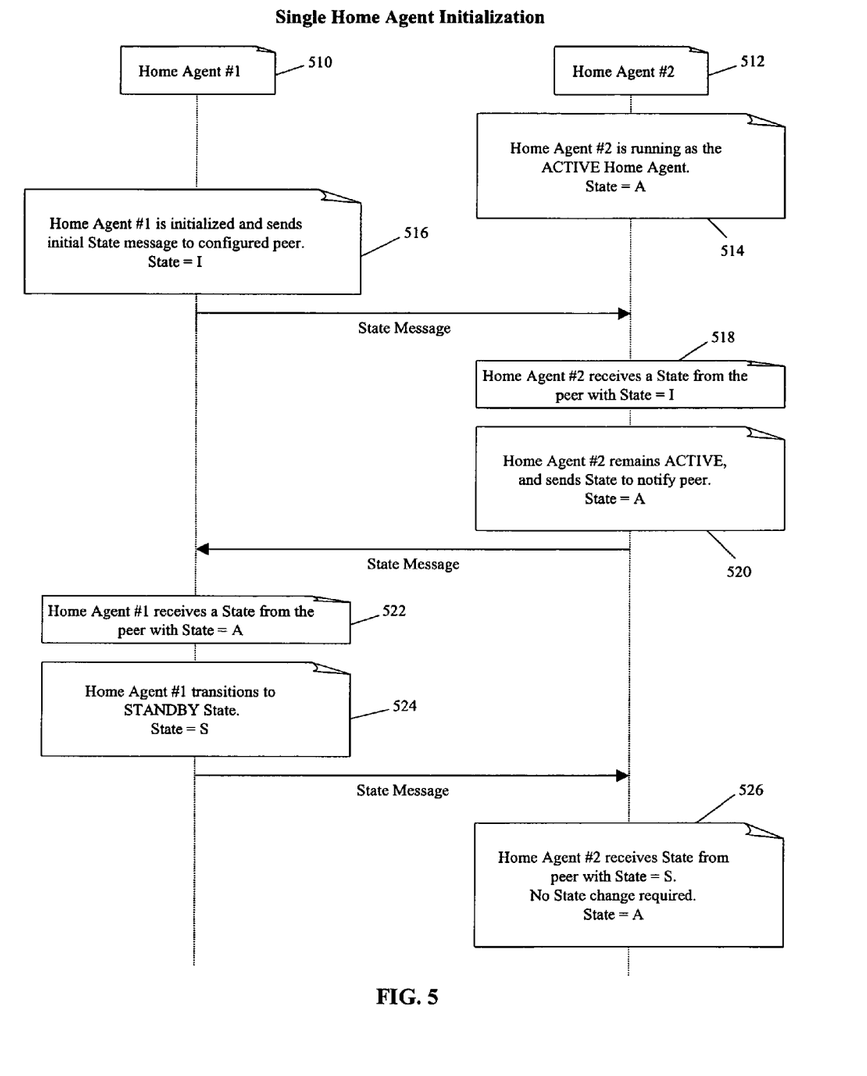
FIG. 5 is a schematic diagram illustrating a single Home Agent initialization in accordance with certain embodiments of the present invention.

FIG. 5 illustrates a single Home Agent initialization involving Home Agent #1 510 and Home Agent #2 512 in accordance with certain embodiments of the present invention. In this example, Home Agent #2 512 is running in the Active state in step 514 and Home Agent #1 510 has come online and is in an Init state. Home Agent #1 510 proceeds to send a state message to Home Agent #2 512 in step 516. Home Agent #2 512 receives the Init state message from Home Agent #1 510 in step 518, remains Active, and sends an Active state message to Home Agent #1 510 in step 520. Home Agent #1 510 receives the state message in step 522, and in some embodiments transitions to Standby in step 524. At a later point in time, Home Agent #1 510 sends a Standby state message to Home Agent #2 512, but no state change is required in step 526. Home Agent #2 512 can remain Active and handle the calls because Home Agent #1 510 has confirmed it is in the Standby state.

Figure 6:
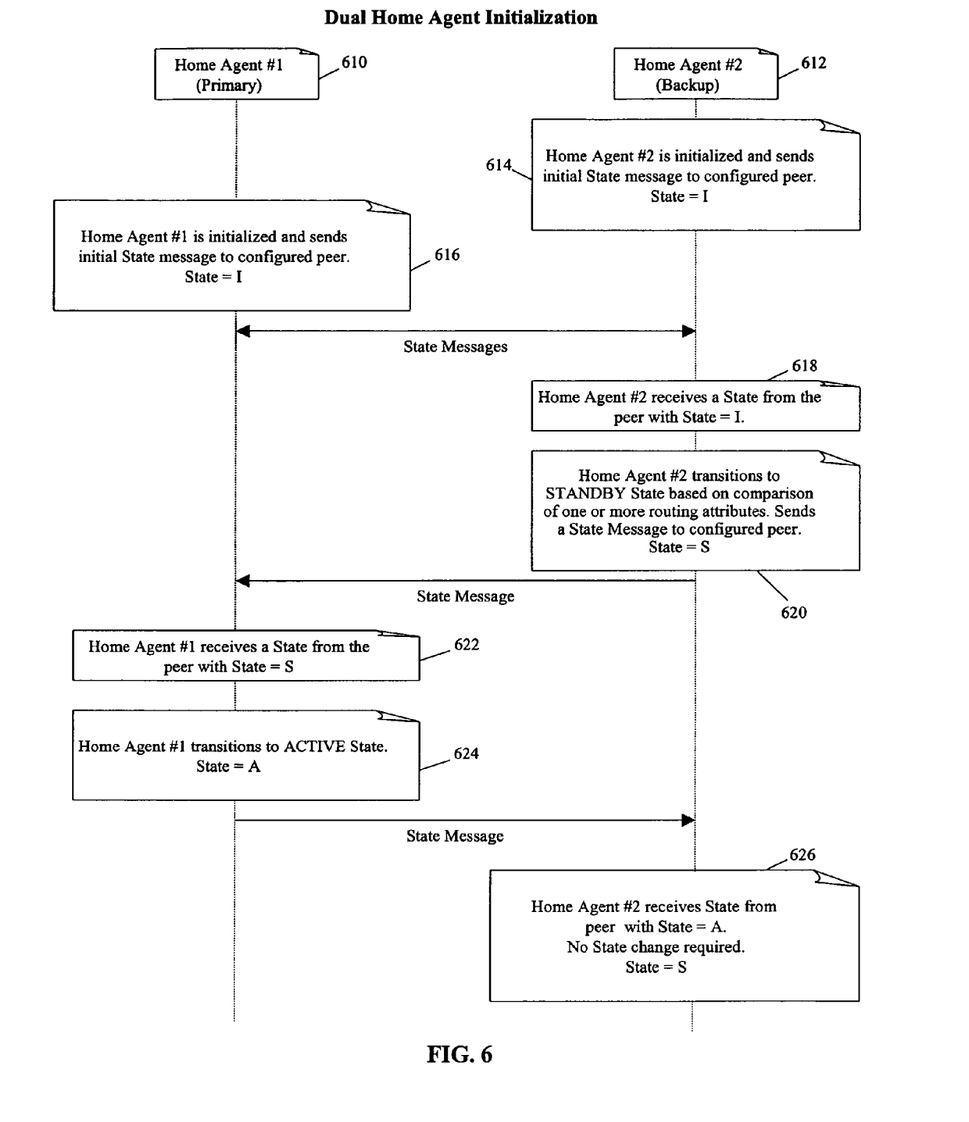
FIG. 6 is a schematic diagram illustrating a dual Home Agent initialization in accordance with certain embodiments of the present invention.

FIG. 6 illustrates a dual Home Agent initialization in accordance with certain embodiments of the present invention. As shown in this example, Home Agent #1 610 and Home Agent #2 612 are initialized and exchange state messages in steps 614 and 616. Home Agent #2 612 receives the state message from Home Agent #1 610 in step 618, and based on a comparison of one or more routing attributes, transitions to Standby in step 620. After transitioning, Home Agent #2 612 alerts Home Agent #1 610 of its Standby state. When Home Agent #1 610 receives notice of the Standby state of Home Agent #2 612 in step 622, it can transition to Active in step 624. In certain embodiments, Home Agent #1 610 remains in an Init state after the comparison of one or more routing attributes because the routing attribute rules do not specify that the Home Agent is to transition into Standby. In other embodiments, Home Agent #1 610 initially transitions to Active based the routing attribute comparison and Home Agent #2 612 transitions to Standby after learning Home Agent #1 is Active. In still other embodiments, the Home Agents may transition based on the outcomes of the routing attribute comparisons and then check the outcome with further state messages. Turing back to the present example, upon receiving confirmation of the Active state from Home Agent #1 610, Home Agent #2 612 can remain in Standby state in step 626.

Figure 7:
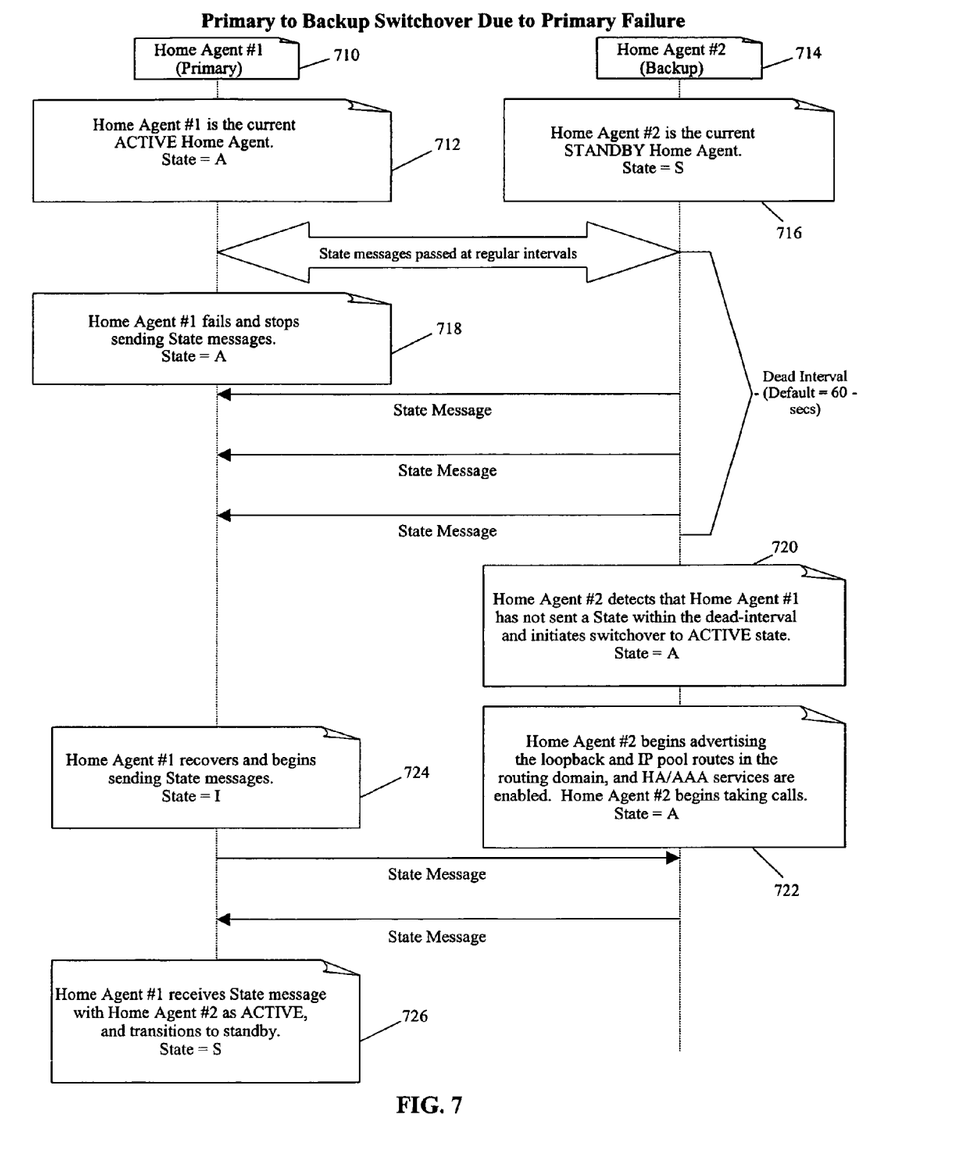
FIG. 7 is a schematic diagram illustrating a primary to backup switchover due to a primary failure in accordance with certain embodiments of the present invention.

FIG. 7 illustrates a primary Home Agent failing and the subsequent switchover to a backup Home Agent in accordance with certain embodiments of the present invention. As shown in this example, Home Agent #1 710 is Active in step 712 and Home Agent #2 714 is Standby in step 716 with state messages being passed at regular intervals. At some point in time Home Agent #1 710 fails, and stops sending state messages in step 718. After a specified dead-interval where Home Agent #2's state messages go unanswered, Home Agent #2 714 initiates a switchover to an Active state 720. Upon transitioning to Active, Home Agent #2 714 begins advertising the loopback and IP pool routes to the routing domain in step 722. Home Agent #2 714 can then begin taking calls. At some later point in time Home Agent #1 710 recovers and begins sending state messages with an Init state to Home Agent #2 714 in step 724. Home Agent #1 710 receives a state message from Home Agent #2 714 with an Active state and Home Agent #1 710 transitions to Standby in step 726.

Figure 8:
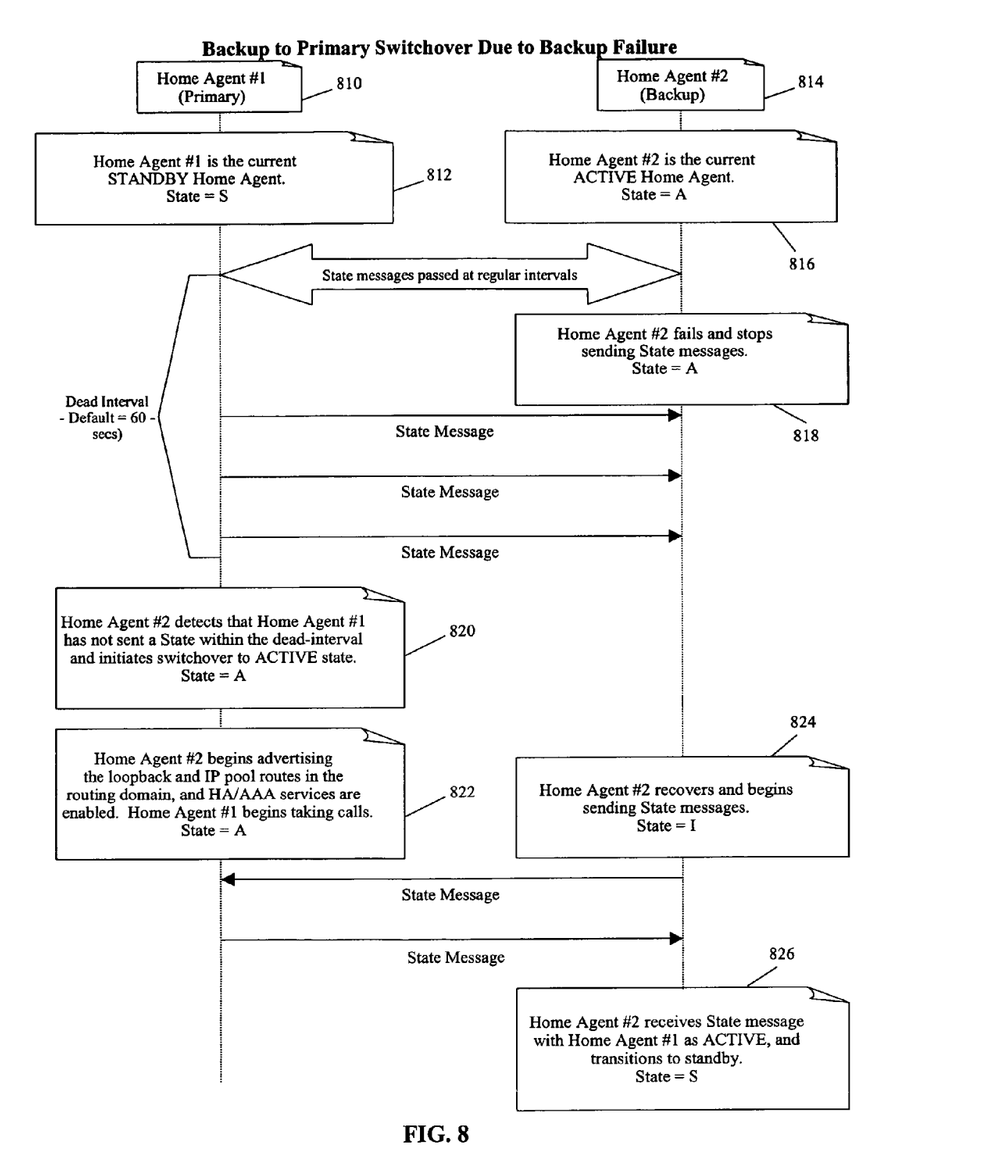
FIG. 8 is a schematic diagram illustrating a backup to primary switchover due to a backup failure in accordance with certain embodiments of the present invention.

FIG. 8 illustrates a backup Home Agent failing and the subsequent switchover to a primary Home Agent in accordance with certain embodiments of the present invention. FIG. 8 may be considered a continuation of the situation in FIG. 7. As shown in this example, Home Agent #1 810 is in a Standby state in step 812 and Home Agent #2 814 is in an Active state in step 816. State messages may then be passed between the Home Agents at regular intervals. At some point in time Home Agent #2 814 fails, and stops sending state messages in step 818. Home Agent #1 810 may continue sending state messages until a specified dead-interval ends. If the end of the dead-interval is reached, Home Agent #1 810 initiates a switchover to Active in step 820. Home Agent #1 810 begins advertising the loopback and IP pool routes to the routing domain upon transitioning to Active, and then can begin taking calls in step 822. At some later point in time, Home Agent #2 814 recovers and begins sending state messages with an Init state in step 824. Home Agent #1 810 sends an Active state message that, upon receipt by Home Agent #2 814, prompts a transition to Standby in step 826.

Figure 9:
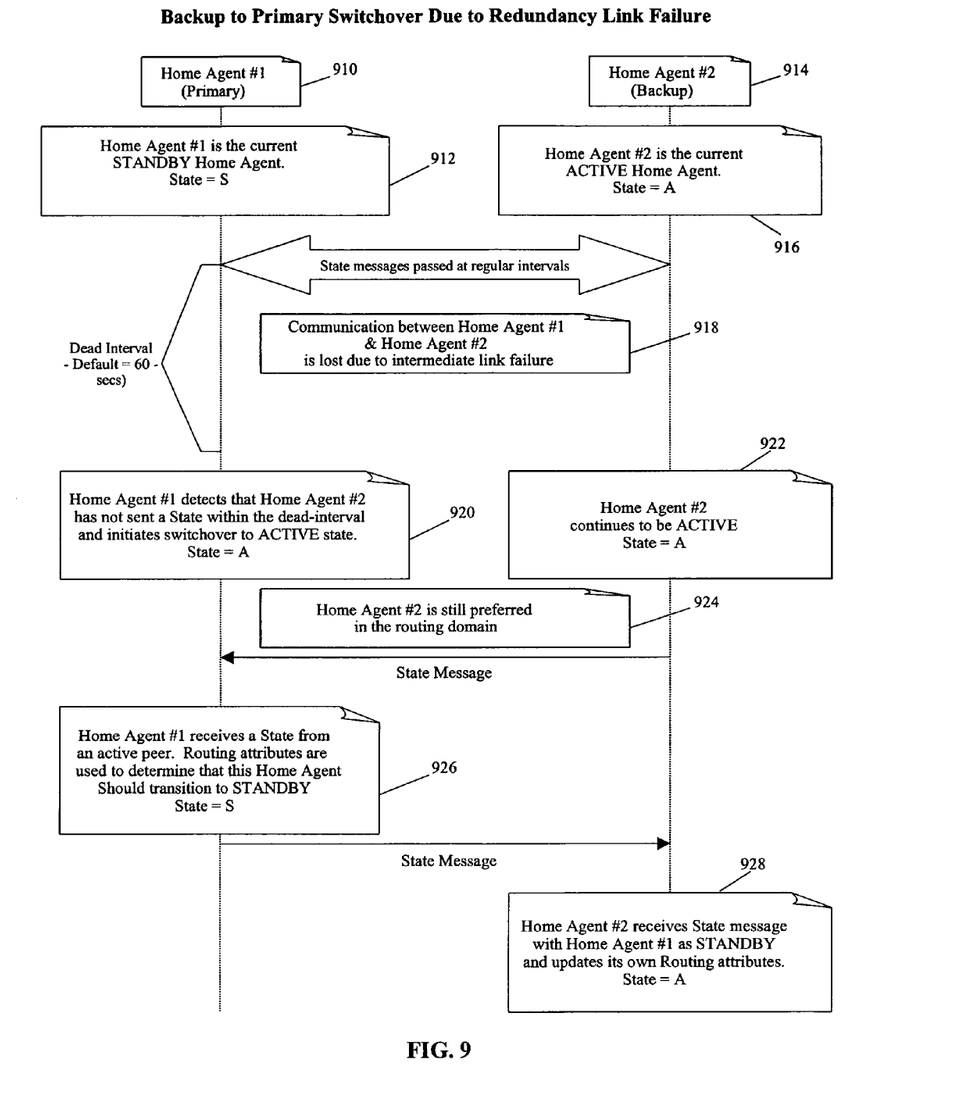
FIG. 9 is a schematic diagram illustrating a backup to primary switchover due to a redundancy link failure in accordance with certain embodiments of the present invention.

FIG. 9 illustrates a backup Home Agent to a primary Home Agent switchover due to a redundancy link failure in accordance with certain embodiments of the present invention. As shown in this example, Home Agent #1 910 is in the Standby state in step 912 and Home Agent #2 914 is in the Active state in step 916. State messages may then be passed between the Home Agents at regular intervals. At some point in time, communication between Home Agent #1 910 and Home Agent #2 914 is lost due to a link failure between the two devices in step 918. Home Agent #1 910 detects that Home Agent #2 914 has not sent a state message within the deadinterval and may initiate a switchover to an Active state in step 920. At the same time, Home Agent #2 914 continues to be Active in step 922.

In certain embodiments of the invention, Home Agent #2 914 remains the preferred Home Agent in the routing domain because the BGP prefers the first Active Home Agent's routing attributes. In other embodiments, the Home Agent that switches to Active when the link goes down may become the preferred Home Agent. In step 926, when Home Agent #1 910 receives a state message from another Active Home Agent, one or more routing attributes are used to determine which Home Agent should transition to Standby. In this example, Home Agent #1 910 transitions back to Standby because Home Agent #2 914 is still preferred in the routing domain. Upon transitioning to Standby, Home Agent #1 910 sends a state message to Home Agent #2 914. Home Agent #2 914 receives the state message with Home Agent #1 910 as Standby and may update its own routing attributes if needed in step 928.

Figure 10:
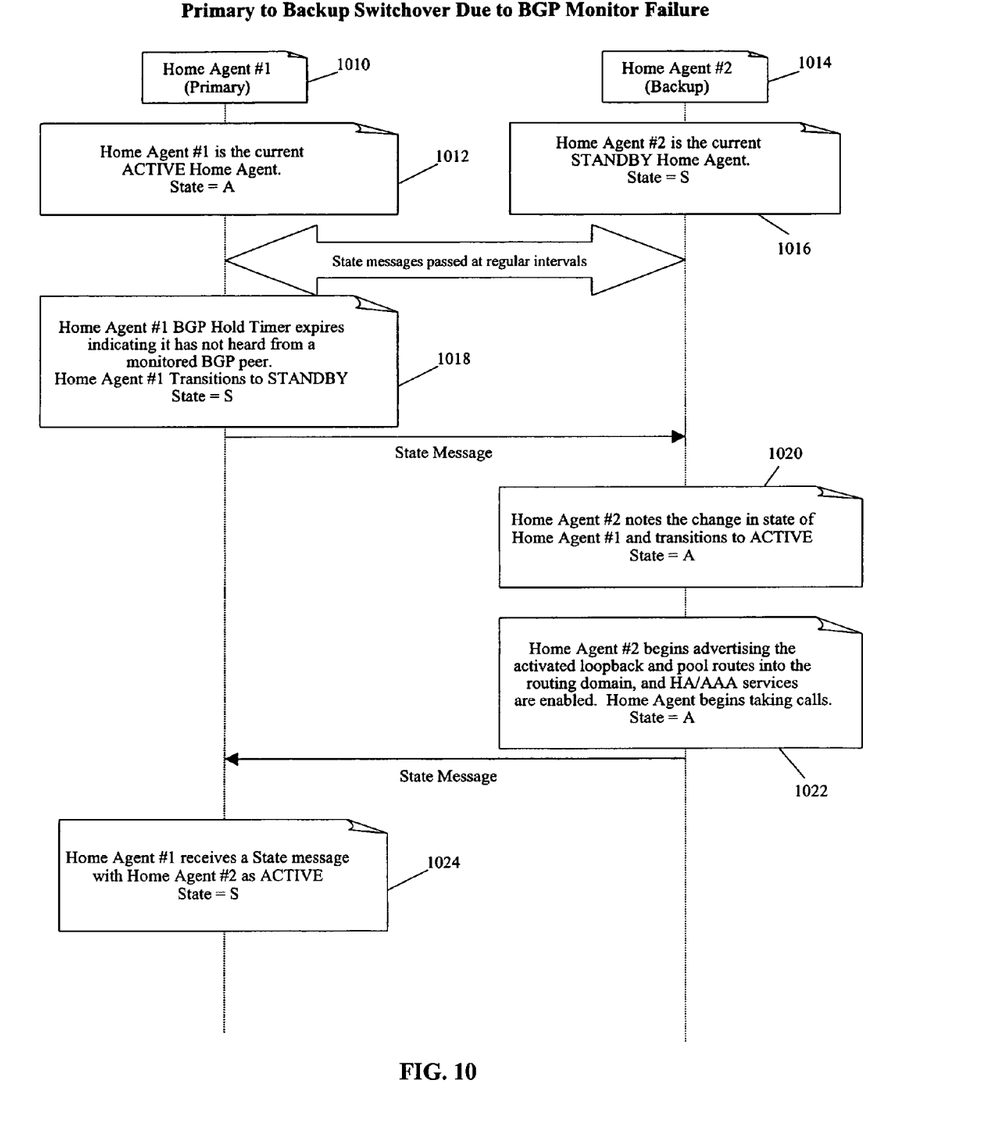
FIG. 10 is a schematic diagram illustrating a primary to backup switchover due to a BGP monitor failure in accordance with certain embodiments of the present invention.

FIG. 10 illustrates a primary Home Agent to a backup Home Agent switchover due to a BGP monitor failure in accordance with certain embodiments of the present invention. As shown in this example, Home Agent #1 1010 is in the Active state in step 1012 and Home Agent #2 1014 is in the Standby state 1016. State messages are then passed between the Home Agents at regular intervals. In certain embodiments, the Home Agents check the BGP router to ensure that it is still functioning. In step 1018, Home Agent #1 1010 checks the BGP router and finds it is not functioning. Home Agent #1 1010 transitions to Standby to allow Home Agent #2 1014 an attempt at contacting a BGP router in the network. The receipt of a Standby state message from Home Agent #1 1010 by Home Agent #2 1014 prompts Home Agent #2 1014 to transition to an Active state in step 1020. Home Agent #2 1014 then begins advertising the loopback and pool routes into the routing domain so it can begin taking calls in step 1022. Home Agent #2 1014 may later send Home Agent #1 1010 a state message that may prompt Home Agent #1 1010 to update its routing attributes, but otherwise remain in its Standby state in step 1024.

Figure 11:
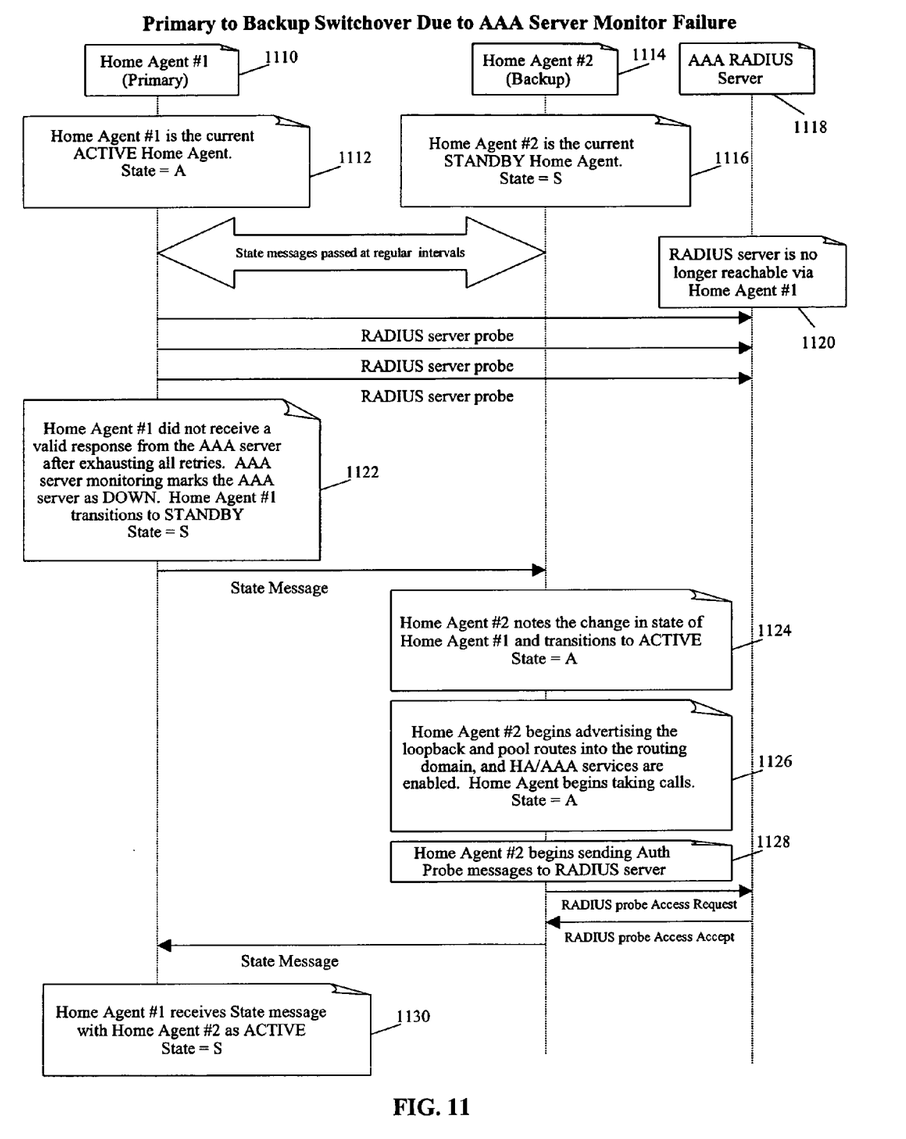
FIG. 11 is a schematic diagram illustrating a primary to backup switchover due to an AAA server monitor failure in accordance with certain embodiments of the present invention.

FIG. 11 illustrates a primary Home Agent to a backup Home Agent switchover due to an AAA server monitor failure in accordance with certain embodiments of the invention. As shown in this example, Home Agent #1 1110 is in an Active state in step 1112 and Home Agent #2 1114 is in a Standby state in step 1116. The two Home Agents may exchange state messages at regular intervals for some time until AAA Radius Server 1118 is no longer reachable by Home Agent #1 1110 in step 1120. Home Agent #1 1110 may continue to send out a number of Radius server probes. In certain embodiments a specified number of attempts may be tried, while in other embodiments a dead-interval may be specified before the Home Agent assumes the AAA server is non-functional. If Home Agent #1 1110 does not receive a valid response from the AAA server after trying according to some predetermined method, Home Agent #1 1110 may transition to Standby in step 1122.

A state message may be received by Home Agent #2 1114 from Home Agent #1 1110 noting the change in state, and prompting Home Agent #2 1114 to transition to an Active state in step 1124. Home Agent #2 1114 then transitions to Active, in step 1126, and begins advertising identification information, which may include IP loopback and pool routes, into the routing domain and enables AAA services so that calls can be taken. In step 1128, Home Agent #2 1114 sends an authorization probe message to the AAA RADIUS server. In certain embodiments, after a response to the RADIUS probe message is accepted by Home Agent #2 1114, it may send a state message to Home Agent #1 1110 to confirm Home Agent #1 1110 can remain in Standby in step 1130. If there is no response from AAA RADIUS server, then Home Agent #2 1114 may try to engage another Home Agent (not shown) in the network possibly utilizing another AAA RADIUS server. Alternatively, Home Agent #2 1114 may send Home Agent #1 1110 a Standby state message to allow Home Agent #1 1110 to try the AAA RADIUS server again. In other embodiments, the state message from Home Agent #2 1114 may be sent after a period of time which may be predetermined.

Other embodiments, extensions, and modifications of the embodiments presented above are within the understanding of one versed in the field upon reviewing the present disclosure. Accordingly, the scope of the present invention in its various aspects should not be limited by the examples presented above. The individual aspects of the present invention, and the entirety of the invention should be regarded so as to allow for design modifications and future developments within the scope of the present disclosure.

What is claimed is:

1. A method for providing Home Agent redundancy comprising:
   initializing a second Home Agent to a Standby state to provide geographic redundancy for a first Home Agent that is located in a geographically separate area from the second Home Agent, wherein the first Home Agent is in an Active state and provides mobility management functions for a plurality of mobile nodes;
   receiving backup information at the second Home Agent from the first Home Agent, wherein the backup information includes data to continue a call on the second Home Agent in the event of a switchover from the first Home Agent to the second Home Agent;
   initiating a switchover from the first Home Agent to the second Home Agent such that the second Home Agent transitions from a Standby state to an Active state to provide mobility management functions for the plurality of mobile nodes;
   advertising in an IP routing domain, through the use of a dynamic routing protocol, identification information and IP pool information at the second Home Agent after transitioning to an Active state, where the identification information includes the identification information of the first Home Agent to allow nodes in the network to transition to the second Home Agent without service interruption; and
   receiving data at the second Home Agent sent from at least one of the plurality of mobile nodes.

2. The method of claim 1, wherein the advertising of identification information includes the advertising of loopback interface routes and a loopback address is shared between the first Home Agent and the second Home Agent.

3. The method of claim 1, wherein the switchover is due to a failure associated with the first Home Agent.

4. The method of claim 3, further comprising sending backup information to the second Home Agent in the Standby state for use in the switchover, wherein the backup information allows the second Home Agent to continue a call with the mobile node.

5. The method of claim 4, wherein the second Home Agent continues a call with the mobile node, wherein the call was initiated while the mobile node was communicating with the first Home Agent.

6. The method of claim 1, further comprising sending backup information to the second Home Agent in the Standby state on a periodic basis.

7. The method of claim 1, further comprising:
comparing one or more routing attributes when more than one Home Agent is in the init state; and
initializing a Home Agent to an Active state based on the routing attributes.

8. The method of claim 1, wherein the second Home Agent uses the same IP based address as the first Home Agent after transitioning to an Active state.

9. An apparatus for providing Home Agent redundancy comprising:
a second Home Agent in a Standby state and in communication with a first Home Agent, wherein the second Home Agent is located in a geographically separate area from the first Home Agent, the second Home Agent receiving backup information from the first Home Agent, wherein the second Home Agent is capable of switching from the Standby state to an Active state, wherein the second Home Agent upon switching from the Standby state to an Active state advertises in a IP routing domain through the use of a dynamic routing protocol IP pool and identification information that includes the identification information of the first Home Agent to allow nodes in the network to transition to the second Home Agent without service interruption, and provides mobility management functions for mobile nodes that were previously handled by the first Home Agent.

10. The system of claim 9, wherein the advertising of identification information includes the advertising of loopback interface routes and a loopback address is shared between the first Home Agent and the second Home Agent.

11. The system of claim 9, in combination with the first Home Agent, wherein the switch from Standby state to Active state in the second Home Agent is due to a failure associated with the first Home Agent.

12. The system of claim 11, wherein the first Home Agent transitions from the Active state to the Standby state after coming back online following a failure that caused the switch from Standby state to Active state in the second Home Agent.

13. The system of claim 9, in combination with the first Home Agent wherein the first Home Agent sends backup information to the second Home Agent, wherein the backup information allows the second Home Agent to continue a call with a mobile node.

14. The system of claim 13, wherein the first Home Agent sends backup information to the second Home Agent is on a periodic basis.

15. The system of claim 13, wherein the second Home Agent continues a call with the mobile node, wherein the call was initiated while the mobile node was communicating with the first Home Agent.

16. The system of claim 9, in combination with the first Home Agent, further comprising: a first Home Agent in an Init state; and a second Home Agent in an Init state, wherein the first Home Agent switches to an Active state based on comparison one or more routing attributes.

17. The system of claim 9, wherein the second Home Agent uses the same IP based address as the first Home Agent after transitioning to an Active state.

18. A system for providing redundancy in a communication network comprising:
a second home agent means for providing mobility management functions for IP communications on behalf of a mobile node, which is initialized to a Standby state to provide backup redundancy, and receives backup information from a first home agent means for providing mobility management function that is located in a geographically separate area from the second home agent means, wherein the second home agent means is capable of switching from the Standby state to an Active state, wherein the second Home Agent means upon switching from a Standby state to an Active state advertises in a IP routing domain through the use of a dynamic routing protocol IP pool and identification information that includes the identification information of the first home agent means and provides mobility management functions for mobile nodes that were previously handled by the first home agent means.

19. The system of claim 18, wherein the advertising of identification information includes the advertising of IP pool and loopback interface routes and a loopback address is shared between the first home agent means and the second home agent means.

20. The system of claim 18, in combination with the first home agent means, wherein the switchover from Standby state to Active state in the second home agent means is due to a failure associated with the first home agent means.

21. The system of claim 20, further comprising means for causing the first home agent means to transition from the Active state to the Standby state after coming back online following a failure that caused the switch from Standby state to Active state in the second Home Agent means.

22. The system of claim 18, further comprising means for sending backup information to the second home agent means for use in the switchover.

23. The system of claim 18, further comprising means for sending backup information to the second home agent means on a periodic basis.

24. The system of claim 18, further comprising:
means for comparing one or more routing attributes when more than one means for providing mobility management is in the Init state; and
means for activating a means for providing mobility management based on the routing attributes.

25. The system of claim 18, wherein the second home agent means uses the same IP based address as the first home agent means after transitioning to an Active state.

* * * * *